United States Patent
Nurmi et al.

(10) Patent No.: US 12,144,361 B2
(45) Date of Patent: Nov. 19, 2024

(54) HEAT STABLE MILK PROTEIN PRODUCT AND METHOD FOR ITS MANUFACTURING

(71) Applicant: VALIO LTD., Helsinki (FI)

(72) Inventors: Niko Nurmi, Helsinki (FI); Päivi Myllärinen, Helsinki (FI)

(73) Assignee: VALIO LTD., Helsinki (FI)

( * ) Notice: Subject to any disclaimer, the term of this patent is extended or adjusted under 35 U.S.C. 154(b) by 0 days.

(21) Appl. No.: 17/982,558

(22) Filed: Nov. 8, 2022

(65) Prior Publication Data

US 2023/0067640 A1 Mar. 2, 2023

Related U.S. Application Data (62) Division of application No. 16/468,398, filed as application No. PCT/FI2017/050931 on Dec. 22, 2017, now Pat. No. 11,523,624.

(30) Foreign Application Priority Data

Dec. 22, 2016 (FI) .................................. 20166019

(51) Int. Cl.
- A23J 3/22 (2006.01)
- A23C 19/06 (2006.01)
- A23C 19/09 (2006.01)

(52) U.S. Cl.
CPC ............ *A23J 3/227* (2013.01); *A23C 19/063* (2013.01); *A23C 19/0912* (2013.01); *A23C 19/0917* (2013.01); *A23J 3/222* (2013.01)

(58) Field of Classification Search
CPC ... A23C 19/09; A23C 19/063; A23C 19/0917; A23C 19/0912; A23J 3/227; A23J 3/222
USPC .......................................................... 426/38
See application file for complete search history.

(56) References Cited

U.S. PATENT DOCUMENTS

| | | | |
|---|---|---|---|
| 5,573,806 A | 11/1996 | Farkye et al. | |
| 11,071,312 B2 | 7/2021 | Nurmi et al. | |
| 2005/0196509 A1 | 9/2005 | Murphy | |
| 2006/0019016 A1 | 1/2006 | Torcatis | |
| 2008/0268104 A1 | 10/2008 | Di Domenico et al. | |
| 2009/0324795 A1 | 12/2009 | Dieter | |
| 2015/0148283 A1 | 5/2015 | Myllarinen | |

FOREIGN PATENT DOCUMENTS

| | | |
|---|---|---|
| DE | 10227747 A1 | 1/2003 |
| EP | 1889545 A1 | 2/2008 |
| JP | S60118146 A | 6/1985 |
| RU | 2478300 C2 | 4/2013 |
| RU | 2559529 C2 | 8/2015 |
| WO | 03007733 A1 | 1/2003 |

(Continued)

OTHER PUBLICATIONS

Encyclopedic Dictionary of Medical Terms, second edition, Moscow, Medicine, 2001, p. 603. *cited in parent.

(Continued)

*Primary Examiner* — Subbalakshmi Prakash
(74) *Attorney, Agent, or Firm* — Robert P. Michal, Esq.; Carter, DeLuca & Farrell LLP (57) ABSTRACT

The present invention relates to a heat stable milk protein product. Particularly, the invention relates to a heat stable milk protein product which can be used as a meat substitute that can be heated by microwaves, fried or grilled. The present invention relates also processes for producing such heat stable milk protein products.

17 Claims, 1 Drawing Sheet

(56) References Cited

FOREIGN PATENT DOCUMENTS

| WO | 03061400 A1 | 7/2003 |
|----|-------------|--------|
| WO | 2014001636 A2 | 1/2014 |
| WO | 2014001642 A2 | 1/2014 |
| WO | 2017077189 A1 | 5/2017 |

OTHER PUBLICATIONS

The Big Soviet Encyclopedia, third edition, the publishing house Soviet Encyclopedia, 1973, p. 180. * cited in parent.

Kolodyaznaya V. S., Food Chemistry, St. Petersburg, SPbGAHPT, 1999, pp. 83-85. *cited in parent.

Balakireva Yu. V. et al., The influence of the pasteurization regime on the polypeptide composition of milk, Fundamental Research N 2, 2012, pp. 170-173. *cited in parent.

Russian Office Action issued in corresponding application No. 2021101238 dated Jul. 2, 2021, (8 pages) together With English language translation (7 pages). *cited in parent.

International Search Report for PCT/FI2017/050931 mailed Mar. 2, 2018, 5 pages. *cited in parent.

Written Opinion of the ISA for PCT/FI2017/05093 l mailed Mar. 2, 2018, 7 pages. *cited in parent.

Search Report for FI20166019 dated Jul. 11, 2017, 2 pages. cited in parent.

[Database—online] Anonymous, "Lactose free milk proteins grains for frying", Mintel, Sep. 2016, 3 pages. cited in parent.

[Database—online] Anonymous, "Grilling cheese", Aug. 2016, Mintel, 2 pages. cited in parent.

[Database—online] Anonymous, "Lighter Halloumi Cheese", Mintel, Mar. 2010, 2 pages. cited in parent.

B. Ergönül et al., "Chemical and textural attributes of Hellim (Halloumi) cheese marketed in Turkey", Mljekarstvo, Jun. 1, 2011, pp. 168-174. cited in parent.

Office Action issued in RU Appln. No. 2019122652 dated Mar. 11, 2020 (w/ translation). cited in parent.

Office Action issued in RU Appln. No. 209122652/10(044274) dated Aug. 7, 2020 (w/ translation). cited in parent.

Office Action issued in RU Appln. No. 2019122652/10(044274) dated Nov. 23, 2020 w/ translation). cited in parent.

HEAT STABLE MILK PROTEIN PRODUCT AND METHOD FOR ITS MANUFACTURING

CROSS-REFERENCE TO RELATED APPLICATIONS

This application is a divisional of U.S. patent application Ser. No. 16/468,398 filed Jun. 11, 2019 which is a national phase entry under 35 U.S.C. 371 of PCT International Application No. PCT/FI2017/050931 filed Dec. 22, 2017, which claims priority to Finnish Patent Application No. 20166019, filed Dec. 22, 2016, the disclosure of each of these applications is expressly incorporated herein by reference in their entirety.

FIELD OF THE INVENTION

The present invention relates to a heat stable milk protein product. Particularly, the invention relates to a heat stable milk protein product which can be used as a cheese or a meat substitute that can be heated by microwaves, fried or grilled. The present invention relates also processes for producing such heat stable milk protein products.

BACKGROUND OF THE INVENTION

There is currently a continuous need for meat substituting protein products in the market. Meat substitutes are food products that approximate the aesthetic qualities and/or chemical characteristics of certain types of meat. Meat substitutes include, i.a., various vegetarian products, such as soybean flour, soybean sausages, tofu, tempeh, quorn, or meatless-based alternatives, such as minced soy protein TSP (textured soy protein), or bean curd, etc. The meat substitute does not contain meat or any component of meat origin but can be used as meat, like fried.

There are cheeses in the market which can be fried and grilled. Typical examples of such cheese are halloumi, queso blanco and mozzarella, which are traditional fresh cheeses made of milk by coagulating casein with rennet, citric acid or a combination of a starter and rennet, respectively.

Publication WO 2014/001636 discloses a method for producing cheese grains which are stable for frying and can be eaten as such, fried or used as a meat substitute.

BRIEF DESCRIPTION OF THE INVENTION

The present invention relates to a heat stable milk protein product in the form of a block, a cube, a mince, a slice, a stripe, a grain, a block pressed from the cubes, minces, slices, stripes and/or grains which can be eaten as such or used as a meat substitute like minced meat or meat after frying and grilling, for example. The texture of the heat stable milk protein product is not thermoplastic. The microstructure of the product is in nanolevel fibrous which is not visible. Microfibers are formed during the manufacturing process and they are stable during the storage of the product. The heat stable milk protein product of the invention does not melt when fried and/or do not scorch onto frying ware when fried.

The protein content of the heat stable milk protein product of the present invention varies within a range of about 10% to about 55% and the fat content of the product varies within a range of about 0% to about 20%. The lactose content of the product varies within a range of about 0% to about 5%. The pH of the product is in the range of about 5.2 to about 5.9.

In addition, the present invention relates to a process for manufacturing a heat stable milk protein product. In one embodiment, the process for manufacturing the heat stable milk protein product of the present invention comprises the steps of:
a) providing a cheese
b) optionally providing a native casein concentrate,
c) providing a hydrocolloid raw material,
d) providing a protein crosslinking enzyme,
e) crumbling the cheese,
f) mixing the crumbled cheese, the hydrocolloid raw material and optionally the casein concentrate,
g) subjecting the mixture to a heat treatment,
h) cooling the heat treated mixture
i) adding a protein crosslinking enzyme to the mixture to form a product mass,
j) optionally adding a lactase to the mixture,
k) optionally adjusting the pH of the product to a range of 5.2 to 5.9,
l) optionally cutting the formed product mass into desired form, such as a block, a cube a stripe, a mince, a grain or a slice,
f) optionally seasoning and/or packing the product mass.

In one embodiment, the process for manufacturing the heat stable milk protein product of the present invention comprises the steps of:
a) providing crumbled cheese,
b) optionally providing a native casein concentrate,
c) providing a hydrocolloid raw material,
d) providing a protein crosslinking enzyme,
e) mixing the crumbled cheese, the hydrocolloid raw material and optionally the casein concentrate,
f) subjecting the mixture to a heat treatment,
g) cooling the heat treated mixture,
h) adding a protein crosslinking enzyme to the mixture to form a product mass,
i) optionally adding a lactase to the mixture,
j) optionally adjusting the pH of the product to a range of 5.2 to 5.9,
k) optionally cutting the formed product mass into desired form, such as a block, a cube, a stripe, a mince, a grain or a slice,
l) optionally seasoning and/or packing the product mass.

In one embodiment, the process for manufacturing the heat stable protein product of the present invention comprises an additional step of:
a1) manufacturing the cheese, and/or
a2) manufacturing the native casein concentrate.

The objects of the invention are achieved by methods and compositions characterized by what is stated in the independent claims. The preferred embodiments of the invention are disclosed in the dependent claims.

DETAILED DESCRIPTION OF THE INVENTION

In the present invention, it was surprisingly found that a heat stable milk protein product can be obtained using raw materials comprising conventional cheese in crumbled form, optionally a native casein concentrate, a protein crosslinking enzyme, and a hydrocolloid. The obtained product can be used as such or in the form of a block, a cube, a mince, a stripe, a slice or a grain, all being stable for heating on a frying-pan or by microwaves.

Thus, the invention is based on a finding, that using crumbled cheese, a protein crosslinking enzyme, a hydrocolloid and optionally a native casein concentrate, a heat stable milk protein product can be produced. The product obtained in the present invention does not melt when fried on a hot fry-pan or a grill or when heated with microwaves. The product can also be frozen before frying and they stay heat stable.

Accordingly, the present invention relates to a process for manufacturing a heat stable milk protein product comprising the steps of:
a) providing a cheese
b) optionally providing a native casein concentrate,
c) providing a hydrocolloid raw material,
d) providing a protein crosslinking enzyme,
e) crumbling the cheese,
f) mixing the crumbed cheese, the hydrocolloid raw material and optionally the casein concentrate,
g) subjecting the mixture to a heat treatment,
h) cooling the heat treated mixture,
i) adding a protein crosslinking enzyme to the mixture to form a product mass,
j) optionally adding a lactase to the mixture,
k) optionally adjusting the pH of the product to a range of 5.2 to 5.9,
l) optionally cutting the formed product mass into desired form, such as a block, a cube, a stripe, a mince a grain or a slice,
m) optionally seasoning and/or packing the product mass.

In one embodiment, the process for manufacturing the heat stable milk protein product of the present invention comprises the steps of:
a) providing crumbled cheese,
b) optionally providing a native casein concentrate,
c) providing a hydrocolloid raw material,
d) providing a protein crosslinking enzyme,
e) mixing the crumbled cheese, the hydrocolloid raw material and optionally the casein concentrate,
f) subjecting the mixture to a heat treatment,
g) cooling the heat treated mixture,
h) adding a protein crosslinking enzyme to the mixture to form a product mass,
i) optionally adding a lactase to the mixture,
j) optionally adjusting the pH of the product to a range of 5.2 to 5.9,
k) optionally cutting the formed product mass into desired form, such as a block, a cube, a stripe, a mince a grain or a slice,
l) optionally seasoning and/or packing the product mass.

In one embodiment, the process for manufacturing the heat stable protein product of the present invention comprises an additional step of:
a1) manufacturing the cheese, and/or
a2) manufacturing the native casein concentrate.

Accordingly, in one embodiment, the process for manufacturing the heat stable milk protein product of the present invention comprises the steps of:
a1) manufacturing a cheese, and
a2) manufacturing a native casein concentrate,
 a) crumbling the cheese,
 b) providing a hydrocolloid raw material,
 c) providing a protein crosslinking enzyme,
 d) mixing the crumbled cheese, the casein concentrate and the hydrocolloid raw material,
 e) subjecting the mixture to a heat treatment,
 f) cooling the heat treated mixture,
 g) adding a protein crosslinking enzyme to the mixture to form a product mass,
 h) optionally adding a lactase to the mixture,
 i) optionally adjusting the pH of the product to a range of 5.2 to 5.9,
 j) optionally cutting the formed product mass into desired form, such as a block, a cube, a stripe, a mince, a grain or a slice,
 k) optionally seasoning and/or packing the product mass.

In one embodiment, the process for manufacturing the heat stable milk protein product of the present invention comprises the steps of:
a1) manufacturing a cheese,
 a) crumbling the cheese,
 b) optionally providing a native casein concentrate,
 c) providing a hydrocolloid raw material,
 d) providing a protein crosslinking enzyme,
 e) mixing the crumbled cheese, the hydrocolloid raw material and optionally the native casein concentrate,
 f) subjecting the mixture to a heat treatment,
 g) cooling the heat treated mixture,
 h) adding a protein crosslinking enzyme to the mixture to form a product mass,
 i) optionally adding a lactase to the mixture,
 j) optionally adjusting the pH of the product to a range of 5.2 to 5.9,
 k) optionally cutting the formed product mass into desired form, such as a block, a cube, a stripe, a mince, a grain or a slice,
 l) optionally seasoning and/or packing the product mass.

In one embodiment, the process for manufacturing the heat stable milk protein product of the present invention comprises the steps of:
a2) manufacturing the native casein concentrate,
 a) providing a cheese,
 b) providing the native casein concentrate,
 c) providing a hydrocolloid raw material,
 d) providing a protein crosslinking enzyme,
 e) crumbling the cheese,
 f) mixing the crumbled cheese, the native casein concentrate and the hydrocolloid raw material,
 g) subjecting the mixture to a heat treatment,
 h) cooling the heat treated mixture,
 i) adding a protein crosslinking enzyme to the mixture to form a product mass,
 j) optionally adding a lactase to the mixture,
 k) optionally adjusting the pH of the product to a range of 5.2 to 5.9,
 l) optionally cutting the formed product mass into desired form, such as a block, a cube, a stripe, a mince, a grain or a slice,
 m) optionally seasoning and/or packing the product mass.

In one embodiment, the process for manufacturing the heat stable milk protein product of the present invention comprises the steps of:
a2) manufacturing a native casein concentrate,
 a) providing a crumbled cheese,
 b) providing the native casein concentrate,
 c) providing a hydrocolloid raw material, d) providing a protein crosslinking enzyme,
e) mixing the crumbled cheese, the casein concentrate and the hydrocolloid raw material,
f) subjecting the mixture to a heat treatment,
g) cooling the heat treated mixture,
h) adding a protein crosslinking enzyme to the mixture to form a product mass,
i) optionally adding a lactase to the mixture,
j) optionally adjusting the pH of the product to a range of 5.2 to 5.9,
k) optionally cutting the formed product mass into desired form, such as a block, a cube a stripe, a mince, a grain or a slice,
l) optionally seasoning and/or packing the product mass.

In one embodiment, the native casein concentrate is produced from a milk raw material, such as skimmed milk by different membrane techniques, such as microfiltration, ultrafiltration, nanofiltration, reverse osmosis or their combinations. The membrane filtrations, such as ultrafiltration and microfiltration, can be performed with diafiltration technique. The filtration techniques are carried out utilizing methods known to the person skilled in the art. In one embodiment, the casein concentrate is produced from skimmed milk by microfiltration. The microfiltration of the milk raw material retains major portion of the casein in the retentate whereas major portion of the whey proteins passes into the permeate. The casein concentrate thus produced can be further concentrated by ultrafiltration. In one embodiment, the casein concentrate is produced from skimmed milk by microfiltration and ultrafiltration. In one embodiment, the casein concentrate is produced from skimmed milk by microfiltration and evaporation. In one embodiment, the casein concentrate is produced from skimmed milk by microfiltration, evaporation and spray or freeze drying. The casein molecules maintain their native form in the filtration procedures.

In one embodiment, the casein concentrate contains about 8.5%-about 20% (w/w) caseins, the total protein content being about 9.15%-about 22% (w/w). In one embodiment, total protein content of the casein concentrate is about 9.15%-about 22% (w/w) of which about 8.5%-about 20% (w/w), respectively, are caseins. In one embodiment, the casein concentrate contains about 8.5%-about 20% (w/w) caseins, the total protein content being about 9.15%-about 22% (w/w), and about 0.7%-about 2.1% (w/w) carbohydrates, of which about 0.4%-about 1.2% (w/w) is lactose. In one embodiment, the casein concentrate contains about 8.5%-about 20% (w/w) caseins, the total protein content being about 9.15%-about 22% (w/w), about 0-about 0.02% (w/w) fat, about 0.7%-about 2.1% (w/w) carbohydrates, about 0.4%-about 1.2% (w/w) lactose, about 0.85%-about 2.3% (w/w) ash, about 2500-7500 mg/kg calcium and about 80-240 mg/kg sodium. In one embodiment, the casein concentrate contains about 8.5% (w/w) caseins, the total protein content being about 9.15% (w/w). In one embodiment, the casein concentrate contains about 20% (w/w) caseins, the total protein content being about 22% (w/w). In one embodiment, the casein concentrate contains about 8.5% (w/w) caseins, the total protein content being about 9.15% (w/w) and about 0.7% (w/w) carbohydrates of which about 0.4% (w/w) is lactose. In one embodiment, the casein concentrate contains about 8.5% (w/w) caseins, the total protein content being about 9.15% (w/w), about 0.08% (w/w) fat, about 0.7% (w/w) carbohydrates, about 0.4% (w/w) lactose, about 0.85% (w/w) ash, about 2500 mg/kg calcium and 80 mg/kg sodium. The casein concentrate can be in the form of a liquid concentrate or a powder. In one embodiment, the native casein concentrate is in a liquid form. In one embodiment, the native casein concentrate is in a powder form. The native casein concentrate powder contains about 70.3% caseins, the total protein content being about 76.3%, about 3.3% lactose, the total carbohydrate content being 5.8%, about 0.7% fat about 20800 mg/kg calcium, about 660 mg/kg sodium, and about 7.1% ash. The casein molecules in the casein concentrate of the present invention are in their native/intact form.

In one embodiment, the casein fraction can be derived and/or produced from fresh milk by microfiltration. The casein fraction can optionally be concentrated by filtration, evaporation or drying.

In the present invention, the cheese can be any type of ripened cheese. In the present invention, the cheese is produced by traditional manufacturing technology by using both rennet and starters. Ready cheese block is salted in brine or surface salted. In the present invention, cheese can be also produced by using instead of starters chemical acidification together with rennet. The ROV of the cheese (moisture on the fat free basis, MFFB) can vary widely. The ripening time of the cheese is not limited. The level of fat can typically vary from 10 to 30% and the salt content can be in the range of 0.7-1.7%.

In the present invention, the hydrocolloid raw material is selected from pectin, gelatin, starch, starch hydrolysates, xanthan gum, gum arabic, guar gum, gellan gum, acacia, agar agar, alginates, konjac, mannan, pullulan, carob, beta glucan, carrageen, polydextrose, cellulose and/or cellulose derivatives. The amount of the hydrocolloid(s) used in the process depends on the characteristics of the hydrocolloid(s) and/or amounts of the other components of the protein product, for example. The protein product of the present invention contains at least one hydrocolloid. In one embodiment, the hydrocolloid is calcium alginate or sodium alginate. In one embodiment, the amount of the hydrocolloid is in the range of 0.5-10% (w/w) based on the weight of the composition of the protein product. In one embodiment, the amount of the hydrocolloid is in the range of 3.4 to 4.3% (w/w) based on the weight of the composition of the protein product. In one embodiment, the amount of the hydrocolloid is about 4.1% (w/w) based on the weight of the composition of the protein product.

The product mass is formed by mixing the crumbled cheese, the hydrocolloid raw material and optionally the casein concentrate. Mixing by stretching effects the fibre formation. Mixing may be done for example by a double screw cooking mixer or a cooking extruder without limiting to these.

In one embodiment of the present invention the mixture of the crumbled cheese, the hydrocolloid raw material and optionally the casein concentrate is subjected to a heat-treatment before the addition of a protein crosslinking enzyme. In one embodiment of the present invention the mixture of the crumbled cheese, the hydrocolloid raw material and optionally the casein concentrate is subjected to a heat-treatment after the addition of a protein crosslinking enzyme. In the method of the invention, the heat-treatment is performed using methods known per se. Typical heat-treatments include heating at a temperature of 60-95° C. In one embodiment, the heat-treatment is performed at a temperature of 80-90° C. in order to inactivate the inhibitors of the cross-linking enzymes, harmful bacteria and/or harmful enzymes present in the raw materials. The heat-treatment time varies typically from about 2 minutes to about 2 hours.

After the heat-treatment, the mixture is cooled to a temperature of about 5-55° C.

The protein crosslinking enzyme suitable for use in the method of the invention may be any enzyme that is known to crosslink milk proteins. These enzymes include transglutaminase, tyrosinase and laccase, for example. Said enzymes can be used alone or in any combinations with each other. The enzyme is typically used in an amount of 0.2 U enzyme/g protein to about 20 U enzyme/g protein, preferably about 2 U enzyme/g protein.

In an embodiment of the invention, the protein crosslinking enzyme is transglutaminase (EC 2.3.2.13). It is commonly known that transglutaminase catalyzes the generation of covalent linkages between the glutamine and lysine amino acid residues present in the protein molecules. Of milk proteins, caseins, in particular κ-casein, are the best substrates for a transglutaminase. β-casein, too, is rich in glutamine and lysine that the enzyme links together. Transglutaminase can be any transglutaminase commonly used in dairy industry. It can be derived from a microbial source, fungus, mould, fish and a mammal. In an embodiment of the invention, transglutaminase is isolated from a microbial source. There are several commercially available transglutaminase enzyme preparations that are suitable for use in the process of the invention. These include Activa® YG (Ajinomoto, Japan), Activa® MP (Ajinomoto, Japan), and Yiming-TG (Yiming Fine Chemicals Co., Ltd., China). In one embodiment, the enzyme preparation is in a liquid form. In one embodiment, the liquid enzyme preparation is manufactured by Valio Oy, Finland. In one embodiment, the liquid transglutaminase enzyme preparation has crosslinking activity of about 100 U/g. In one embodiment, the transglutaminase preparation is used in an amount of about 2.0-5.0 U/g protein. In one embodiment, the transglutaminase preparation is used in an amount of about 2.0 U/g protein. Optimum conditions depend on the enzyme used and they can be obtained from the manufacturers of the commercial enzymes.

In another embodiment, the crosslinking enzyme is selected from laccase and/or tyrosinase. Laccases (EC 1.10.3.2), derived from fungi and bacteria, such as, fungus *Trametes hirsute*, catalyze the crosslinking between carbohydrates and proteins (oxidation of aromatic compounds and cysteine) with applications in food processing for reduction of allergenicity, for example. Tyrosinases (EC 1.14.18.1) are enzymes which catalyzes the oxidation of phenols such as tyrosine, with applications in food processing for reduction of allergenicity, for example. Tyrosinases can be derived from a variety of plant, animal and fungal species, i.e. filamentous fungus *Trichoderma reesei*. Optimum conditions depend on the enzyme used and they can be obtained from the manufacturers of the commercial enzymes.

In one embodiment, the process comprises a step wherein lactose is hydrolysed. There are several different commercially available lactase enzymes (ß-D-galactosidases). These include for instance enzymes produced with the *Kluyveromyces fragilis* strain, such as HA lactase (Chr. Hansen A/S, Denmark), or enzymes produced with the *Kluyveromyces lactis* strain, such as Validase (Valley Research Inc., USA), Maxilact L2000 lactase (DSM, Holland) and Godo YNL (Godo Shusei Company, Japan). Optimum hydrolysis conditions depend on the used enzyme and they can be obtained from the manufacturers of the commercial enzymes.

In the step of cutting the formed product mass into desired form, such as a block, a cube, a mince, a stripe, a grain or a slice, for example, in the process of the present invention, the formulation is done using methods and equipment known to a person skilled in the art.

In step of the seasoning and/or packing the product in the process of the present invention, the product is seasoned and/or packed using methods and equipment known to a person skilled in the art. The product can be brined or salted with dry salt. Salt can be NaCl, KCl, Na-carbonate, sodium hydrogen phosphate, AIV-mix or a milk-based mineral product (dry or liquid, concentrate, brine), or a mixture thereof. The milk-based mineral product refers to, for example, a salt described in publication EP 1061811 B1, i.e. a milk mineral powder known as trademark Valio Milk Mineral Powder VMMP (Valio Oy). Other feasible milk-based mineral products include trademarks such as Capolac® MM-0525 BG (Arla Foods Ingredients), Vitalarmor CA (Armor Proteins) and Sodidiet 40 Ml (Sodiaal Industrie). The product can be seasoned with spices, herbs, fruits and/or vegetables.

The process of the invention may further contain additional optional process steps, such as adding further ingredients, such as fats, oils and/or emulsifiers, other protein and/or amino acid sources such as plant based proteins, and/or a further-processing step, for instance recovering the product in a manner characteristic to it. These optional steps are performed in an appropriate stage of the process known by a person skilled in the art. The selection of suitable optional steps and conditions belongs to knowledge of a person skilled in the art.

In one embodiment, the process of the invention comprises a step of providing a fat and/or oil. In one embodiment, the process of the invention contains a step of mixing a fat and/or oil with the crumbled cheese, the hydrocolloid raw material and optionally the casein concentrate. In one embodiment, the process of the invention comprises steps of providing a fat and/or oil and mixing the fat and/or oil with the crumbled cheese, the hydrocolloid raw material and optionally the casein concentrate. In one embodiment, the fat is selected from cream and butter or a mixture thereof. In one embodiment, the oil is selected from vegetables oils such as, rape oil, sunflower oil, olive oil, or a mixture thereof.

In one embodiment, the process of the invention comprises a step of providing a plant based protein. In one embodiment, the process of the invention contains a step of mixing a plant based protein with the crumbled cheese, the hydrocolloid raw material and optionally the casein concentrate. In one embodiment, the process of the invention comprises the steps of providing a plant based protein and mixing the plant based protein with the crumbled cheese, the hydrocolloid raw material and optionally the casein concentrate. In one embodiment, the plant based protein is selected from wheat protein, oat protein, soy protein, potato protein, lupine protein, flax protein, hemp protein, corn protein barley protein, rye protein, pea protein, bean protein, spirulina protein, or a mixture thereof.

The present invention relates also to a heat stable milk protein product, in the form a block, a cube, a mince, a grain, a slice, a stripe or block or filet pressed or processed from the cubes, minces, stripes, grains and/or slices. In one embodiment, the heat stable protein product of the present invention refers to a meat substitute or a meat analogue.

The heat stable milk protein product has a microstructure which is in nanolevel fibrous. The fibrous structure contains crosslinked casein proteins. Crosslinked casein proteins contain covalent blocking bonds which are not broken by heat, thus the heat-stability of the product is improved. Furthermore, crosslinked casein improves water binding in the structure and water is retained in the structure also during heating. The structure does not collapse when heated. Crosslinked casein structure creates a large number of narrow capillars, which retain water molecules inside the structure.

The crosslinked casein protein molecules are at least dimers, but can also be trimers or polymers. In one embodiment the crosslinked casein protein molecules are, for example, over 30 kDa or over 50 kDa in size.

Figure 1:
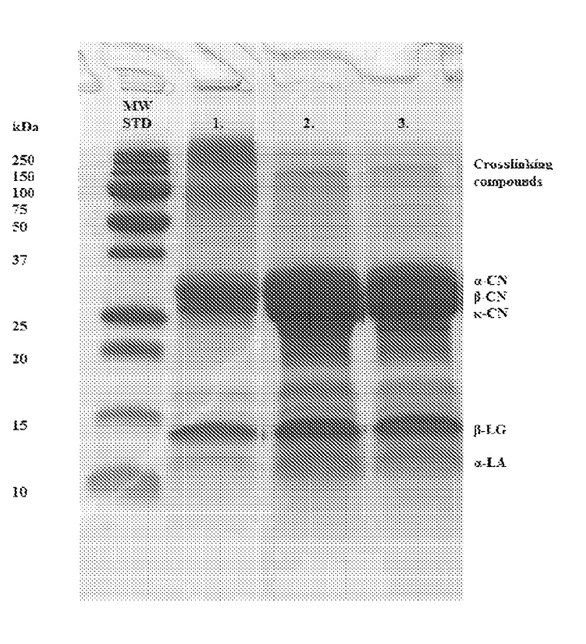
FIG. 1 shows a SDS-page, which shows protein profiles of the following compositions:
MW STD: molecular weight standard,
Sample 1: the heat stable milk protein product of Example 3,
Sample 2: the intermediate product of Example 3 taken before the addition of transglutaminase,
Sample 3: cheese ripened for 21 days.

It can clearly be seen from the SDS-PAGE analysis how the transglutaminase has crosslinked casein proteins as well as smaller proteins formed during the cheese process (sample 1). The crosslinked proteins are molecules having a size of about 100 to 300 kDa. The sample 1, which was produced using transglutaminase, was heat stable and did not melt when heated on a frying pan whereas samples 2 and 3, which were produced without transglutaminase, melted. Without wishing to be bound by a theory, the crosslinked protein molecules having the size of about 100 to 300 kDa and the changes in their molecular sizes due to the effect of transglutaminase transforms the casein proteins and the smaller proteins formed during the cheese process from monomers to di- and trimers and possible up to polymers. The change in the molecular size of these proteins freezes the proteins and the heat induced movement of the molecules diminishes.

The protein content of the heat stable milk protein product can vary in the range of about 10% to about 55%. In an embodiment, the protein content is about 20% to about 50%. In an embodiment, the protein content is about 23% to about 26%.

The fat content of the heat stable milk protein product can vary within a range of about 0% to about 20%. In one embodiment, the fat content is within a range of about 5% to about 7.5%.

In one embodiment, the protein content of the heat stable milk protein is about 10% to about 55% or about 20% to about 50% or about 23% to about 26% and the fat content of the product in the range of about 0% to about 20% or about 5% to about 7.5%.

The lactose content of the heat stable milk protein product can vary within the range of about 0% to about 5%.

In one embodiment, the protein content of the heat stable milk protein product is about 10% to about 55% or about 20% to about 50% or about 23% to about 26% and the lactose content of the product is from about 0% to about 5%.

In one embodiment, the protein content of the heat stable milk protein product is from about 10% to about 55% or from about 20% to about 50% or from about 23% to about 26%, the fat content of the product is from about 0% to about 20% or from about 5% to about 7.5% and the lactose content of the product is from about 0% to about 5%.

The pH of the heat stable milk protein product is in the range of about 5.2 to about 5.9. In an embodiment, the pH of product is about 5.2 to about 5.5.

In one embodiment, the protein content of the heat stable milk protein product is about 10% to about 55% or about 20% to about 50% or about 23% to about 26% and the pH of the product is about 5.2 to about 5.9 or about 5.2 to about 5.5.

In one embodiment, the protein content of the heat stable milk protein product is about 10% to about 55% or about 20% to about 50% or about 23% to about 26%, the lactose content of the product is from about 0% to about 5% and the pH of the product is about 5.2 to about 5.9 or about 5.2 to about 5.5.

In one embodiment, the protein content of the heat stable milk protein product is from about 10% to about 55% or from about 20% to about 50% or from about 23% to about 26%, the fat content of the product is from about 0% to about 20% or from about 5% to about 7.5%, the lactose content of the product is from about 0% to about 5% and the pH of the product is about 5.2 to about 5.9 or about 5.2 to about 5.5.

The protein product of the invention can be in form of a block or a fillet or a cube, a grain or a slice. The protein product can be consumed as such or heated, fried, grilled or cooked. The product does not melt and/or clump together when fried on a hot fry-pan or a grill or when heated with microwaves. Thus, the protein product of the present invention is heat stable. The product can also be frozen before frying while staying heat stable.

The following examples are presented for further illustration of the invention without limiting the invention thereto.

EXAMPLES

Example 1

Preparation of the Cheese

Raw milk was separated and standardized to have a fat content of 1%. Then, the milk was pasteurized at 72° C. for 15 s, cooled to a temperature of 33° C. and pumped into a cheese vat. About 0.04% by weight of $CaCl_2$-solution (34%), about 0.05% rennet and a starter culture (DVS CH-N19) were added to the warm milk and mixed thoroughly with the milk. The mixture was allowed to curdle for about 30 minutes. The curdled milk was cut into grains with a cutting tool in the cheese vat. The grains were heated up to a temperature of 40° C. during about 100 minutes while stirring all the time. After this, the whey was separated from the grains and the grains were pressed into cheese blocks for a period of 14 hours (prepressing 4 h and repressing 10 h). After the pressing, the cheese was brined for 14 hours after which the cheese was ripened for about 21 days at a temperature of 11° C.

Example 2

Preparation of the Casein Concentrate

Raw milk was separated and the obtained skimmed milk was pasteurized at 72° C. for 15 s and cooled. The cooled skimmed milk was microfiltered at a temperature of 50° C. to provide a casein fraction. The obtained casein fraction was concentrated by evaporation and dried into a powder.

Example 3

Preparation of a Heat Stable Milk Protein Product Having Protein Content of 25.7% and Fat Content of 7%

The cheese prepared as described in Example 1 was crumbled. The crumbled cheese (21 kg), water (3 kg), the native casein concentrate powder prepared as described in Example 2 (1.5 kg) and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product had protein content of 25.7%, fat content of 7%, carbohydrate content of 3.7%, ash content of 4.4%, about 9500 mg/kg calcium and about 7100 mg/kg sodium.

Example 4

Preparation of a Heat Stable Milk Protein Product Having Protein Content of 23.3% and Fat Content of 7.5%

The cheese prepared as described in Example 1 was crumbled. The crumbled cheese (22.5 kg), water (3.4 kg) and calcium alginate (1.1 kg) were mixed with a screw mixer (Karl Schnell) to provide a well-mixed mass. After this, the mass was heated with a direct steam up to a temperature of 80-90° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass.

After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product had protein content of 23.3% and fat content of 7.5%.

Example 5

Preparation of a Heat Stable Milk Protein Product Having Protein Content of 20.0% and Fat Content of 5.1%

The cheese prepared as described in Example 1 was crumbled. The crumbled cheese (15 kg), water (8.7 kg), the native casein concentrate powder prepared as described in Example 2 (1.5 kg) and sodium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.3. The milk protein product had protein content of 20.0% and fat content of 5.1%.

Example 6

Preparation of a Heat Stable Milk Protein Product Having Protein Content of 22.4% and Fat Content of 20%

The cheese prepared as described in Example 1 was crumbled. The crumbled cheese (18.1 kg), water (1.3 kg), the native casein concentrate powder prepared as described in Example 2 (1.4 kg), butter (5.1 kg) and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product had protein content of 22.4% and fat content of 20.0%.

Example 7

Preparation of a Heat Stable Milk Protein Product Having Protein Content of 26.5% and Fat Content of 6.0%

The cheese prepared as described in Example 1 was crumbled. The crumbled cheese (18 kg), water (5 kg), the native casein concentrate powder prepared as described in Example 2 (1.5 kg), wheat protein (1.5 kg) and calcium alginate (1.1 kg) were mixed with a screw mixer (Karl Schnell) to provide a well-mixed mass. Wheat protein can be replaced, also partly, with oat protein. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (pH 5.2-5.9) with an acid or a base. The pH of the milk protein product was adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product has protein content of 26.5% and fat content of 6.0%.

Example 8

Preparation of a Heat Stable Milk Protein Product Having Protein Content of 23.8% and Fat Content of 6.3%

The cheese prepared as described in Example 1 was crumbled. The crumbled cheese (18 kg), water (4.9 kg), the native casein concentrate powder prepared as described in Example 2 (1.5 kg), calcium alginate (1.1 kg), chili and paprika flavor ingredients and salt (0.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product has protein content of 23.8% and fat content of 6.3%.

Example 9

Preparation of a Heat Stable Milk Protein Product Having Protein Content of 19.6% and Fat Content of 6.9%

The cheese prepared as described in Example 1 was crumbled.
A microfiltered casein concentrate was prepared from pasteurized and cooled skimmed milk by microfiltering and then ultrafiltering the retentate obtained from the microfiltration with concentration factor 3. The casein concentrate had the following composition: total protein 9.15%, casein proteins 8.49%, carbohydrates 0.7%, lactose 0.4%, calcium 2500 mg/kg, sodium 80 mg/kg, iodine 24 ng/g, ash 0.85%, fat 0.08%.

The crumbled cheese (20.6 kg), water (5 kg), the microfiltered casein concentrate (5.3 kg) and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.3 The milk protein product has protein content of 19.6% and fat content of 6.9%.

Example 10

Preparation of a Heat Stable Milk Protein Product Having Protein Content of 25.7% and Fat Content of 7.0%

In the present example, a cheese prepared as disclosed in Example 1, but ripened for about 90 days at a temperature of 11° C., was crumbled. The crumbled cheese (21 kg), water (3.4 kg), the native casein concentrate powder prepared as described in Example 2 (1.5 kg), and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product has protein content of 25.7%, fat content of 7.0%, carbohydrate content of 3.7%, ash content of 4.4%, about 9500 mg/kg calcium and about 7100 mg/kg sodium.

Example 11

Preparation of a Heat Stable Milk Protein Product Having Protein Content of 25.7% and Fat Content of 7.0%

In the present example, a cheese prepared as disclosed in Example 1, but ripened for about 180 days at a temperature of 11° C., was crumbled. The crumbled cheese (21 kg), water (3.4 kg), the native casein concentrate powder prepared as described in Example 2 (1.5 kg), and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (pH 5.2-5.9) with an acid or a base. The pH of the product was adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.3 The milk protein product has protein content of 25.7%, fat content of 7.0%, carbohydrate content of 3.5%, ash content of 4.4%, about 9500 mg/kg calcium and about 7200 mg/kg sodium.

Example 12

Preparation of a Heat Stable Milk Protein Product Having Protein Content of 25.7% and Fat Content of 7.0%

In the present example, a cheese prepared as disclosed in Example 1, but ripened for about 270 days at a temperature of 11° C., was crumbled. The crumbled cheese (21 kg), water (3.4 kg), the native casein concentrate powder prepared as described in Example 2 (1.5 kg), and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product has protein content of 25.7% and fat content of 7.0%.

Example 13

Preparation of a Heat Stable Milk Protein Product Having Protein Content of 53.6% and Fat Content of 0.1%

The cheese prepared as described in Example 1 was crumbled. The crumbled cheese (0.3 kg), water (5.6 kg), the native casein concentrate powder prepared as described in Example 2 (20 kg) and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH).The milk protein product does not melt and/or clump together when fried on a hot fry-pan or a grill or when heated with microwaves. The product can also be frozen before frying and it stays heat stable. The pH of the product was adjusted to pH 5.2. The milk protein product has protein content of 53.6% and fat content of 0.1%.

Example 14

Preparation of a Heat Stable Milk Protein Product Having Protein Content of 25% and Fat Content of 7%

The cheese prepared as described in Example 1 was crumbled. The crumbled cheese (21.0 kg), water (4.35 kg), the native casein concentrate powder prepared as described in Example 2 (1.5 kg) and calcium alginate (0.15 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto LtD, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product has protein content of 25.7% and fat content of 7.0%.

Example 15

Preparation of a Heat Stable Milk Protein Product Having Protein Content of 25.7% and Fat Content of 7%

The cheese prepared as described in Example 1 was crumbled. The crumbled cheese (21.0 kg), water (1.5 kg), the native casein concentrate powder prepared as described in Example 2 (1.5 kg) and calcium alginate (3.0 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 55° C. while stirring the mixture all the time. When the temperature is in the range of 40-55° C., a transglutaminase enzyme (Ajinomoto Ltd, Japan) in an amount of 2 U/g protein was added to the mass. After the addition of transglutaminase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.3. The milk protein product has protein content of 25.7%, fat content of 7.0%, carbohydrate content of 3.7%, ash content of 4.4%, about 9500 mg/kg calcium and 7100 mg/kg sodium.

Example 16

Preparation of a Heat Stable Milk Protein Product Having Protein Content of 23.7% and Fat Content of 14% Using Laccase The cheese prepared as described in Example 1 was crumbled. The crumbled cheese (21 kg), water (3 kg), butter (3.0 kg), the native casein concentrate powder prepared as described in Example 2 (1.5 kg) and calcium alginate (1.1 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 45° C. while stirring the mixture all the time. When the temperature is in the range of 40-45° C., a laccase enzyme produced by *Trametes hirsuta* in an amount of 7 U/g protein was added to the mass. After the addition of laccase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The milk protein product had a protein content of 23.7% and a fat content of 14.0%.

Example 17

Preparation of a Heat Stable Milk Protein Product Having Protein Content of 25.7% and Fat Content of 7% Using Tyrosinase The cheese prepared as described in Example 1 was crumbled. The crumbled cheese (21.0 kg), calcium alginate (2.5 kg), water (2.0 kg) and the native casein concentrate powder prepared as described in Example 2 (1.5 kg) were mixed with a screw mixer (Karl Schnell) to provide a well-mixed mass. After this, the mass was heated with a direct steam up to a temperature of 75-95° C. in order to destroy the possible harmful bacteria, enzymes and inhibitors. The heated mixture was cooled indirectly with cold water to a temperature of 40° C. while stirring the mixture all the time. When the temperature was approximately 40° C., a tyrosinase enzyme produced by *Trichoderma reesei* in an amount of 8 U/g protein was added to the mass. After the addition of tyrosinase, the pH of the mass can be adjusted to the desired level (5.2-5.9) with an acid or a base. The cooled mass can then be formulated into the desired form, such as a block, cubes or slices, for example, with appropriate machinery, such as mono pump and vacuum filler (VEMAG Maschinenbau GmbH). The milk protein product does not melt and/or clump together when fried on a hot fry-pan or a grill or when heated with microwaves. The product can also be frozen before frying and it stays heat stable. The pH of the product was adjusted to pH 5.2. The milk protein product has a protein content of 25.7% and a fat content of 7.0%. It will be obvious to a person skilled in the art that, as the technology advances, the inventive concept can be implemented in various ways. The invention and its embodiments are not limited to the examples described above but may vary within the scope of the claims.

The invention claimed is:

1. A meat substitute produced from a composition consisting essentially of:
   cheese in crumbled form,
   a native casein concentrate,
   a protein crosslinking enzyme,
   a hydrocolloid in an amount of 0.5% to 10% (w/w),
   optionally fat, and
   optionally lactose,
   wherein the meat substitute has a milk protein content of about of about 10% to about 55%, a fat content of about 0% to about 20%, a lactose content of about 0% to about 5%, and a pH of about 5.2 to about 5.9, and
   wherein the meat substitute is heat stable which does not melt when fried and/or does not scorch onto frying ware when fried, and the meat substitute has a fibrous microstructure of crosslinked casein proteins having a size of about 100 to 300 kDa.

2. The meat substitute of claim 1, wherein the milk protein content of the meat substitute is about 20% to about 50%.

3. The meat substitute of claim 1, wherein the milk protein content of the meat substitute is about 23% to about 26%.

4. The meat substitute of claim 1, wherein the fat content of the meat substitute is from about 5% to about 7.5%.

5. The meat substitute of claim 1, wherein the pH of the meat substitute is about 5.2 to about 5.5.

6. The meat substitute of claim 1, wherein the protein crosslinking enzyme is selected from transglutaminase, tyrosinase and laccase.

7. The meat substitute of claim 1, wherein the meat substitute contains the protein crosslinking enzyme in an amount of 0.2 U enzyme/g protein to about 20U enzyme/g protein.

8. The meat substitute of claim 1, wherein the meat substitute contains the protein crosslinking enzyme in an amount of about 2U enzyme/g protein.

9. The meat substitute of claim 1, wherein the hydrocolloid is selected from pectin, gelatine, starch, starch hydrolysates, xanthan gum, gum arabic, guar gum, gellan gum, acacia, agar, alginates, konjac, mannan, pullulan, carob, beta glucan, carrageen, polydextrose, cellulose and cellulose derivatives.

10. The meat substitute of claim 1, wherein the hydrocolloid is calcium alginate or sodium alginate.

11. The meat substitute of claim 1, wherein the amount of the hydrocolloid in the meat substitute is in the range of 3.4% to 4.3% (w/w).

12. The meat substitute of claim 1, wherein the amount of the hydrocolloid in the meat substitute product is about 4.1% (w/w).

13. The meat substitute of claim 1, wherein the carbohydrate content of the meat substitute is from 3.5% to 3.7%.

14. The meat substitute of claim 1, wherein the meat substitute is in the form of a block, a cube, a mince, a slice, a stripe, a grain or a block pressed from the cubes, minces, slices, stripes and/or grains.

15. A meat substitute produced from a composition consisting essentially of:
cheese in crumbled form,
a native casein concentrate powder,
a protein crosslinking enzyme,
a hydrocolloid in an amount of 0.5% to 10% (w/w),
optionally fat, and
optionally lactose,
wherein the meat substitute has a milk protein content of about 10% to about 55%, a fat content of about 0% to about 20%, a lactose content of about 0% to about 5%, a pH of about 5.2 to about 5.9, and
wherein the ratio of the conventional cheese in crumbled form to the native casein concentrate powder is in the range of 10:1-14:1 (w/w), and
wherein the meat substitute is heat stable which does not melt when fried and/or does not scorch onto frying ware when fried, and the meat substitute has a fibrous microstructure of crosslinked casein proteins having a size of about 100 to 300 kDa.

16. A composition comprising:
cheese in crumbled form,
a native casein concentrate,
a protein crosslinking enzyme,
a hydrocolloid in an amount of 0.5% to 10% (w/w),
optionally fat, and
optionally lactose,
wherein the composition is heated to provide a meat substitute having a milk protein content of about of about 10% to about 55%, a fat content of about 0% to about 20%, a lactose content of about 0% to about 5%, and a pH of about 5.2 to about 5.9, and
wherein the meat substitute is heat stable which does not melt when fried and/or does not scorch onto frying ware when fried, and the meat substitute has a fibrous microstructure of crosslinked casein proteins having a size of about 100 to 300 kDa.

17. A composition comprising:
cheese in crumbled form,
a native casein concentrate powder,
a protein crosslinking enzyme,
a hydrocolloid in an amount of 0.5% to 10% (w/w),
optionally fat, and
optionally lactose,
wherein the ratio of the cheese in crumbled form to the native casein concentrate powder is in the range of 10:1-14:1 (w/w), and
wherein the composition is heated to provide a meat substitute having a milk protein content of about 10% to about 55%, a fat content of about 0% to about 20%, a lactose content of about 0% to about 5%, a pH of about 5.2 to about 5.9, and
wherein the meat substitute is heat stable which does not melt when fried and/or does not scorch onto frying ware when fried, and the meat substitute has a fibrous microstructure of crosslinked casein proteins having a size of about 100 to 300 kDa.

* * * * *